*A. Waterhouse,*

*Pocket Knife.*

No. 91,093. Patented June 22. 1869.

Witnesses:
J. S. Nichols,
J. H. Grindley,
James M. Lewis

Inventor.
Alfd Waterhouse,

ADDISON G. WATERHOUSE, OF SAN FRANCISCO, CALIFORNIA.

Letters Patent No. 91,693, dated June 22, 1869.

IMPROVEMENT IN POCKET-KNIVES.

The Schedule referred to in these Letters Patent and making part of the same.

*To all whom it may concern:*

Be it known that I, ADDISON G. WATERHOUSE, of the city and county of San Francisco, in the State of California, have invented a new and useful Improvement on Pocket-Knives.

The nature of my invention consists in forming the knife so as to have the blades slide out of the ends of the handle, and to have two blades formed of one piece of steel or metal.

To enable others skilled in the art to make and use my invention, I will proceed to describe its construction and operation.

Figure 3:
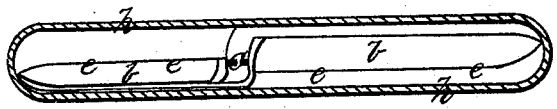
Figure 4:
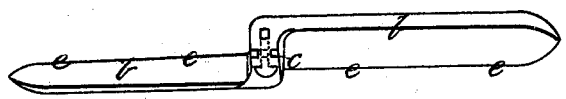

The blades $b$ (see Figures 2, 3, and 4,) are to be formed on each end of a piece of steel the length of the handle $h$.

The cutting-edge of each blade, $e$, is to be formed on sides opposite to one another. (See fig. 4.)

Said blades are to be encased or enclosed in the handle $h$, and to be so arranged as to be slid out of their respective ends of the handle $h$.

The object of having the edge of each blade fixed on the side opposite to the other (see figs. 2, 3, and 4,) is, that when one blade is out, (see fig. 2,) and when the pressure, when cutting, is placed upon the outer blade, the other blade, that remains in the handle, forms, with its back, a leverage for the outer blade. (Small blade, fig. 2.)

The case or handle $h$ is to be formed so that blade-piece (fig. 4) will fit closely inside of it, and that the centre $c$ of said blade-piece can be slid from one end of said handle to the other, so that the blades $b$ can be slid out at their respective ends of the handle $h$.

In the sides of said handle I have a slot arranged, (see S, Figures 1 and 2,) running nearly the whole length of said handle, in which a thumb-piece, T, (see figs. 1 and 2,) is to be arranged, so that it can slide all along the slot S.

Figure 1:
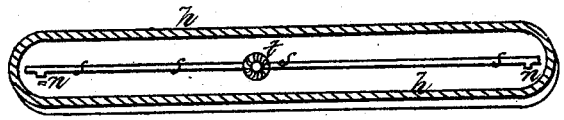
Figure 2:
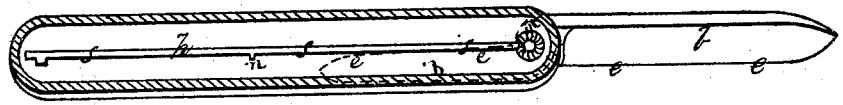

Said thumb-piece T is to be attached to the centre of said blade-piece, at $c$, so that the blades can be slid out and in by forcing the thumb-piece C, figs. 1 and 2, along the slot S, figs. 1 and 2.

In the slot I have a notch placed at each end, and one near the centre, at $n$, (see figs. 1 and 2,) into each of which the thumb-piece T is sprung, by a spring inside of the handle.

When said blades are slid along, so that said thumb-piece T reaches either of said notches, it is caught by them, and the blades are held firmly in their place.

What I claim as my invention, and desire to secure by Letters Patent, is—

The forming of two blades on one piece of steel or metal, with their edges upon opposite sides, so that the back of one will form a leverage for the other, and the mode of sliding the said blades out of the ends of the handle, in the manner and for the purpose substantially as above set forth.

A. G. WATERHOUSE.

Witnesses:
JAMES M. LEWIS,
J. H. GRINDLEY.